Dec. 7, 1948.    M. S. JENNER    2,455,365
FLASH SYNCHRONIZER FOR CAMERAS WITH CURTAIN SHUTTERS
Filed April 11, 1945
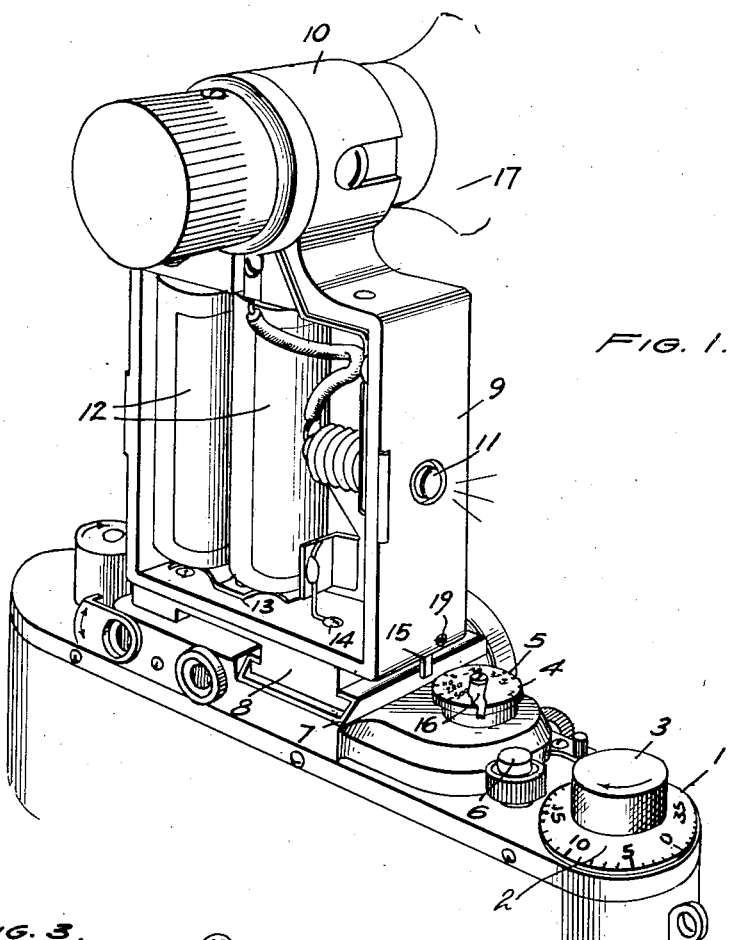
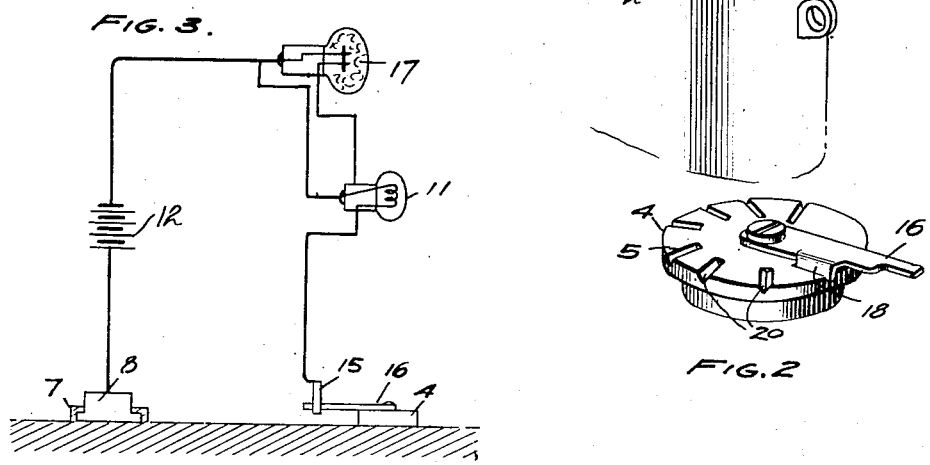
INVENTOR
MYRON S. JENNER
BY William D. Hall
ATTORNEY Patented Dec. 7, 1948

2,455,365

UNITED STATES PATENT OFFICE 2,455,365

FLASH SYNCHRONIZER FOR CAMERAS WITH CURTAIN SHUTTERS

Myron S. Jenner, New York, N. Y.

Application April 11, 1945, Serial No. 587,821

3 Claims. (Cl. 95—11.5)

(Granted under the act of March 3, 1883, as amended April 30, 1928; 370 O. G. 757)

The invention described herein may be manufactured and used by or for the Government for governmental purposes, without the payment of any royalty thereon.

This invention relates to cameras, and more particularly to improvements in device for synchronizing the flash of a light with the opening of a shutter of a camera.

In cameras of the "Leica" type in which adjustments can be made for different timings of shutter openings, it is often desirable to illuminate the object being photographed. Heretofore, no means have been provided to synchronize the illumination with the opening of the shutter, and the success of the photograph has depended considerably upon the skill of the operator in manipulating the illuminating means and the shutter.

It is, therefore, an object of this invention to provide a device for automatically controlling the synchronization of the illuminating means with the opening of a camera shutter.

A further object is the provision of a device for synchronizing an illuminating means with a camera shutter, which device can be applied to a camera of the "Leica" type without altering the camera structure in any manner.

These and other objects are attained by the novel construction and arrangement of parts hereinafter described and illustrated by the accompanying drawings, forming a part hereof and in which:

Fig. 1 is a perspective showing the device applied to a camera.

Fig. 2 is a perspective view of an element of the device.

Fig. 3 is a wiring diagram of an electrical circuit used in the device.

Referring to the drawings, in Fig. 1 is shown a portion of a well known type of "Leica" camera 1 having a film winder 2 provided with control means including a scale and a knurled knob 3. Also, there is provided the usual metal disc 4 with indicia or markings 5 for setting the movable shutter for different time openings or aperture sizes, and button 6 for releasing a spring to open the shutter after the shutter is energized by the winder 2. The camera is also provided on its upper wall, which is metallic with a channel 7 for receiving a flashlight illuminating device.

All of the structure thus far described is old and well known, and is the structure of the usual "Leica" type of camera, the casing of which is made of metal.

In accordance with the invention, a flanged base 8 has a close sliding fit in the channel 7. Supported by the base 8 is a casing 9 of insulating material, such as a phenol condensate product, plastic, or the like. Mounted on the upper wall of casing 9 is a lamp socket 10, which is adapted to receive a lamp 17 (see wiring diagram in Fig. 3). On a side wall of the casing is also mounted small pilot incandescent lamp 11 in parallel with lamp 17, and positioned in the casing are dry cells 12, arranged in series and contacting metal plate 13 which is connected by a wire to a pin 14 extending through the bottom wall of the casing 9 and contacting base 8. Projecting from the lower wall of casing 9 is a contact or metal lug 15 which is in an electrical circuit (see Fig. 3) in series with the lamps and batteries. The lug 15 is made of spring metal and abuts a screw 19 so that it can be moved adjustably away from the side wall of the casing to enable it to engage a small contacting means or arm 16 which is adjustably screwed down on the time disc 4. The arm 16 can be placed in various positions on the disc depending upon the timing of the shutter desired, and is provided with a downwardly projecting ledge 18 forming a position locating means which is adapted to rest in grooves 20 of the disc 4, and assures the arm 16 remaining in a definite set position. If desired, a reflector can be used with the device.

In operation, the arm 16 is set to one of the marks 20 on the disc 4 for giving the desired timing of the shutter. The film winder 2 is then rotated to present an unexposed section of film before the lens, and also to rotate the disc 4 to its starting position, which is determined by the stopping of the rotation of the winding disc, as is the usual procedure with cameras of the type herein considered. The arm 16, of course will be now in a definite position relative to the lug 15. The button 6 is then depressed to open the shutter and rotate disc 4, which brings arm 16 in contact with lug 15 and completes a circuit through the lamps 11 and 17. The lamp 11 is for the purpose of indicating to the operator the condition of the batteries and the completion of the electrical circuit.

From the above description it will be seen that there has been provided a simple and positive device for synchronizing a flash lamp with the shutter of a camera. No alterations are necessary to the camera, and the device can be set for any desired timing of the shutter. At each setting of the arm 16 on the disc 4, when the film winding disc is rotated, the arm will be positioned in a definite position relative to the lug 15. It is, therefore, seen that no skill of the operator is necessary for accurate synchronization.

The above description is to be considered as illustrative and not limitative of the invention, of which modifications can be made without departing from the spirit and scope of the invention as set forth in the appended claims.

The invention having been described, what is claimed is:

1. In combination with a camera having a movable focal plane shutter provided with an aperture, winder means for energizing the shutter, release means for the shutter, and control means for varying the size of the aperture in the shutter, said control means including a disc rotating in synchronization with the movement of the shutter and having indicia thereon for selecting an aperture of the desired size; said disc having a contacting means positioned thereon, said contacting means having a position locating means, and a contact fixed thereto a constant angular distance away from any selected indicia; a contact mounted on the camera and non-rotatable with respect to the disc, means for mounting said last mentioned contact to engage the contact of the disc when the disc is rotated; a flash lamp mounted on said camera, and means interconnecting the contact and lamp for producing an electrical current through the lamp when the disc rotates to cause the contacting means to engage the contact and flash the lamp in positive synchronization with the movement of any selected shutter aperture.

2. The combination of claim 2, wherein adjusting means is provided between the disc and the contact thereon for adjustably positioning the contacting means with respect to any other indicia on the disc.

3. The combination of claim 2 wherein the contacting means is provided with locating means for positioning the contacting means on an indicia of the disc and means for fixedly positioning the contacting means to said disc.

MYRON S. JENNER.

REFERENCES CITED

The following references are of record in the file of this patent:

UNITED STATES PATENTS

| Number | Name | Date |
|---|---|---|
| 2,117,509 | Schwartz | May 17, 1938 |
| 2,123,112 | Krueger | July 5, 1938 |
| 2,224,674 | Filsinger | Dec. 10, 1940 |
| 2,277,233 | Kende et al. | Mar. 24, 1942 |
| 2,284,486 | Hineline | May 26, 1942 |
| 2,298,107 | Carr | Oct. 6, 1942 |
| 2,304,035 | Steiner | Dec. 1, 1942 |
| 2,358,941 | Schwarz | Sept. 26, 1944 |